US 12,251,765 B2

(12) United States Patent
Takahashi

(10) Patent No.: US 12,251,765 B2
(45) Date of Patent: Mar. 18, 2025

(54) DRILL

(71) Applicant: Sumitomo Electric Hardmetal Corp., Itami (JP)

(72) Inventor: Youichi Takahashi, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 216 days.

(21) Appl. No.: 17/617,593

(22) PCT Filed: Jan. 27, 2021

(86) PCT No.: PCT/JP2021/002781
§ 371 (c)(1),
(2) Date: Dec. 9, 2021

(87) PCT Pub. No.: WO2022/162774
PCT Pub. Date: Aug. 4, 2022

(65) Prior Publication Data
US 2023/0150039 A1    May 18, 2023

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/082* (2013.01); *B23B 2251/085* (2013.01); *B23B 2251/182* (2022.01); *B23B 2251/44* (2013.01); *B23B 2251/443* (2013.01)

(58) Field of Classification Search
CPC .......... B23B 2251/182; B23B 2251/18; B23B 2251/443; B23B 51/068; B23B 51/06; B23B 51/02
See application file for complete search history.

(56) References Cited

U.S. PATENT DOCUMENTS

| 5,716,172 A | 2/1998 | Nakamura et al. |
| 2010/0322726 A1* | 12/2010 | Glimpel ................. B23B 51/02 408/229 |
| 2012/0201619 A1 | 8/2012 | Olsson |
| 2016/0074944 A1 | 3/2016 | Koga et al. |

(Continued)

FOREIGN PATENT DOCUMENTS

| JP | 3-96113 U1 | 10/1991 |
| JP | 7-308815 A | 11/1995 |

(Continued)

*Primary Examiner* — Alan Snyder
(74) *Attorney, Agent, or Firm* — XSENSUS LLP

(57) ABSTRACT

A ridgeline between the thinning face and the flank face includes a first thinning portion contiguous to the outer cutting edge, and a second thinning portion contiguous to the first thinning portion. When viewed in a direction along the central axis, the first thinning portion is linear and the second thinning portion is curved. When viewed in the direction along the central axis, the first thinning portion, and a boundary between the first thinning portion and the second thinning portion are located rearward in a rotational direction relative to a first straight line, and are located forward in the rotational direction relative to a second straight line, the first straight line being a straight line passing through the central axis and parallel to the first thinning portion, and the second straight line being a straight line perpendicular to the first straight line.

10 Claims, 14 Drawing Sheets

(56) References Cited

U.S. PATENT DOCUMENTS

| | | | |
|---|---|---|---|
| 2017/0291229 A1* | 10/2017 | Genini | B23B 51/02 |
| 2019/0308254 A1 | 10/2019 | Arai et al. | |
| 2020/0030893 A1* | 1/2020 | Krenzer | B23B 51/02 |

FOREIGN PATENT DOCUMENTS

| | | | |
|---|---|---|---|
| JP | 2011-509838 | A | 3/2011 |
| JP | 2012-161912 | A | 8/2012 |
| JP | 2017-164836 | A | 9/2017 |
| JP | 2019-181615 | A | 10/2019 |
| JP | 2020-023051 | A | 2/2020 |
| WO | 2014/175396 | A1 | 10/2014 |
| WO | 2017/137551 | A1 | 8/2017 |

* cited by examiner

REARWARD IN ROTATIONAL DIRECTION ←→ FORWARD IN ROTATIONAL DIRECTION

REARWARD IN ROTATIONAL DIRECTION ←→ FORWARD IN ROTATIONAL DIRECTION

REARWARD IN ROTATIONAL DIRECTION ← → FORWARD IN ROTATIONAL DIRECTION

DRILL

CROSS-REFERENCE TO RELATED APPLICATION

The present application is based on PCT filing PCT/JP2021/002781, filed Jan. 27, 2021, the entire contents of which are incorporated herein by reference.

TECHNICAL FIELD

The present disclosure relates to a drill.

BACKGROUND ART

Japanese Patent Laying-Open No. 2019-181615 (PTL 1) describes a drill having an arc-shaped thinning cutting blade.

CITATION LIST

Patent Literature

PTL 1: Japanese Patent Laying-Open No. 2019-181615

SUMMARY OF INVENTION

A drill according to the present disclosure rotates around a central axis, and includes a rake face, a flank face, and a thinning face. The flank face is contiguous to the rake face. The thinning face is contiguous to each of the rake face and the flank face. A ridgeline between the rake face and the flank face includes an outer cutting edge. A ridgeline between the thinning face and the flank face includes a first thinning portion contiguous to the outer cutting edge, and a second thinning portion contiguous to the first thinning portion. When viewed in a direction along the central axis, the first thinning portion is linear and the second thinning portion is curved. When viewed in the direction along the central axis, the first thinning portion, and a boundary between the first thinning portion and the second thinning portion are located rearward in a rotational direction relative to a first straight line, and are located forward in the rotational direction relative to a second straight line, the first straight line being a straight line passing through the central axis and parallel to the first thinning portion, and the second straight line being a straight line perpendicular to the first straight line.

A drill according to the present disclosure rotates around a central axis, and includes a rake face, a flank face, and a thinning face. The flank face is contiguous to the rake face. The thinning face is contiguous to each of the rake face and the flank face. A ridgeline between the rake face and the flank face includes an outer cutting edge. A ridgeline between the thinning face and the flank face includes a first thinning portion contiguous to the outer cutting edge, and a second thinning portion contiguous to the first thinning portion. When viewed in a direction along the central axis, the first thinning portion is linear and the second thinning portion is curved. When viewed in the direction along the central axis, the first thinning portion, and a boundary between the first thinning portion and the second thinning portion are located rearward in a rotational direction relative to a first straight line, and are located forward in the rotational direction relative to a second straight line, the first straight line being a straight line passing through the central axis and parallel to the first thinning portion, and the second straight line being a straight line perpendicular to the first straight line. When viewed in the direction along the central axis, the second thinning portion has a radius of curvature which is more than or equal to 5% and less than or equal to 30% of twice a distance between an outer end portion of the outer cutting edge and the central axis. When viewed in the direction along the central axis, a distance between the first thinning portion and the first straight line is more than or equal to 0.001 mm and less than or equal to 1.0 mm.

DETAILED DESCRIPTION

Figure 1:
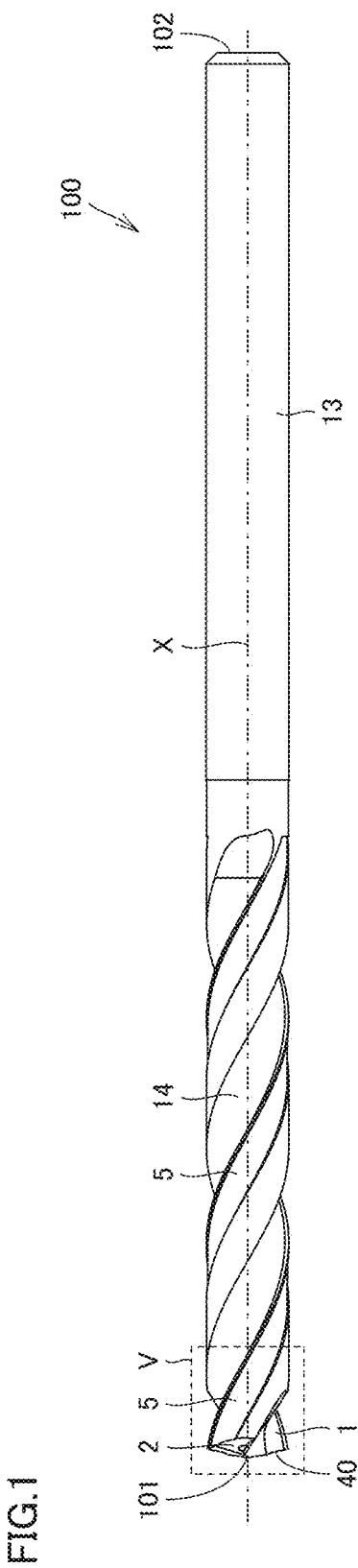
FIG. 1 is a schematic plan view showing a configuration of a drill according to a first embodiment.

Problem to be Solved by the Present Disclosure

An object of the present disclosure is to provide a drill capable of improving a hole positional tolerance.

Advantageous Effect of the Present Disclosure

According to the present disclosure, a drill capable of improving a hole positional tolerance can be provided.

Description of Embodiments of the Present Disclosure

First, embodiments of the present disclosure will be listed and described.

(1) A drill 100 according to the present disclosure rotates around a central axis X, and includes a rake face 1, a flank face 2, and a thinning face 3. Flank face 2 is contiguous to rake face 1. Thinning face 3 is contiguous to each of rake face 1 and flank face 2. A ridgeline between rake face 1 and flank face 2 includes an outer cutting edge 40. A ridgeline between thinning face 3 and flank face 2 includes a first thinning portion 31 contiguous to outer cutting edge 40, and a second thinning portion 32 contiguous to first thinning portion 31. When viewed in a direction along central axis X, first thinning portion 31 is linear and second thinning portion 32 is curved. When viewed in the direction along central axis X, first thinning portion 31, and a boundary between first thinning portion 31 and second thinning portion 32 are located rearward in a rotational direction relative to a first straight line A1, and are located forward in the rotational direction relative to a second straight line A2, first straight line A1 being a straight line passing through central axis X and parallel to first thinning portion 31, and second straight line A2 being a straight line perpendicular to first straight line A1.

(2) In drill 100 according to (1) above, when viewed in the direction along central axis X, second thinning portion 32 may have a radius of curvature which is more than or equal to 5% and less than or equal to 30% of twice a distance between an outer end portion 43 of outer cutting edge 40 and central axis X.

(3) In drill 100 according to (1) or (2) above, drill 100 may further include an outer circumferential surface 5 contiguous to each of rake face 1 and flank face 2, and a heel face 4 contiguous to each of outer circumferential surface 5, flank face 2 and thinning face 3. Outer circumferential surface 5 maybe provided with a first margin 51 contiguous to outer cutting edge 40, and a second margin 52 spaced rearward in the rotational direction from first margin 51. When viewed in the direction along central axis X, a boundary line 6 between heel face 4 and flank face 2 may be linear.

(4) In drill 100 according to (3) above, a coolant hole 7 may be provided at a position spaced from boundary line 6.

(5) In drill 100 according to (3) above, a coolant hole 7 may be provided so as to divide boundary line 6.

(6) In drill 100 according to (1) or (2) above, drill 100 may further include an outer circumferential surface 5 contiguous to each of rake face 1 and flank face 2, and a heel face 4 contiguous to each of outer circumferential surface 5, flank face 2 and thinning face 3. Outer circumferential surface 5 may be provided with a first margin 51 contiguous to outer cutting edge 40, and a second margin 52 spaced rearward in the rotational direction from first margin 51. When viewed in the direction along central axis X, a boundary line 6 between heel face 4 and flank face 2 may be curved.

(7) In drill 100 according to (6) above, a coolant hole 7 may be provided at a position spaced from boundary line 6.

(8) In drill 100 according to (6) above, a coolant hole 7 may be provided so as to divide boundary line 6.

(9) In drill 100 according to any one of (1) to (8) above, when viewed in the direction along central axis X, a distance between first thinning portion 31 and first straight line A1 may be more than or equal to 0.001 mm and less than or equal to 1.0 mm.

(10) A drill 100 according to the present disclosure rotates around a central axis X, and includes a rake face 1, a flank face 2, and a thinning face 3. Flank face 2 is contiguous to rake face 1. Thinning face 3 is contiguous to each of rake face 1 and flank face 2. A ridgeline between rake face 1 and flank face 2 includes an outer cutting edge 40. A ridgeline between thinning face 3 and flank face 2 includes a first thinning portion 31 contiguous to outer cutting edge 40, and a second thinning portion 32 contiguous to first thinning portion 31. When viewed in a direction along central axis X, first thinning portion 31 is linear and second thinning portion 32 is curved. When viewed in the direction along central axis X, first thinning portion 31, and a boundary between first thinning portion 31 and second thinning portion 32 are located rearward in a rotational direction relative to a first straight line A1, and are located forward in the rotational direction relative to a second straight line A2, first straight line A1 being a straight line passing through central axis X and parallel to first thinning portion 31, and second straight line A2 being a straight line perpendicular to first straight line A1. When viewed in the direction along central axis X, second thinning portion 32 has a radius of curvature which is more than or equal to 5% and less than or equal to 30% of twice a distance between an outer end portion 43 of outer cutting edge 40 and central axis X. When viewed in the direction along central axis X, a distance between first thinning portion 31 and first straight line A1 is more than or equal to 0.001 mm and less than or equal to 1.0 mm.

Details of Embodiments of the Present Disclosure

Next, the details of the embodiments of the present disclosure will be described with reference to the drawings. The same or corresponding parts are designated by the same reference symbols in the following drawings, and a description thereof will not be repeated herein.

First Embodiment

First, a configuration of a drill 100 according to a first embodiment of the present disclosure is described.

FIG. 1 is a schematic plan view showing the configuration of drill 100 according to the first embodiment. As shown in FIG. 1, drill 100 according to the first embodiment includes a front end 101, a rear end 102, a rake face 1, a flank face 2, an outer circumferential surface 5, a flute 14, and a shank 13. Drill 100 is rotatable around a central axis X. Front end 101 of drill 100 is a portion that faces a workpiece. Rear end 102 of drill 100 is a portion that faces a tool that rotates drill 100. Shank 13 is a portion that is attached to the tool that rotates drill 100. In a direction along central axis X, rear end 102 is located on the opposite side to front end 101. Central axis X passes through front end 101 and rear end 102. The direction along central axis X is an axial direction. A direction perpendicular to the axial direction is a radial direction. As used herein, a direction from front end 101 toward rear end 102 is referred to as rearward in the axial direction. Conversely, a direction from rear end 102 toward front end 101 is referred to as forward in the axial direction.

Figure 2:
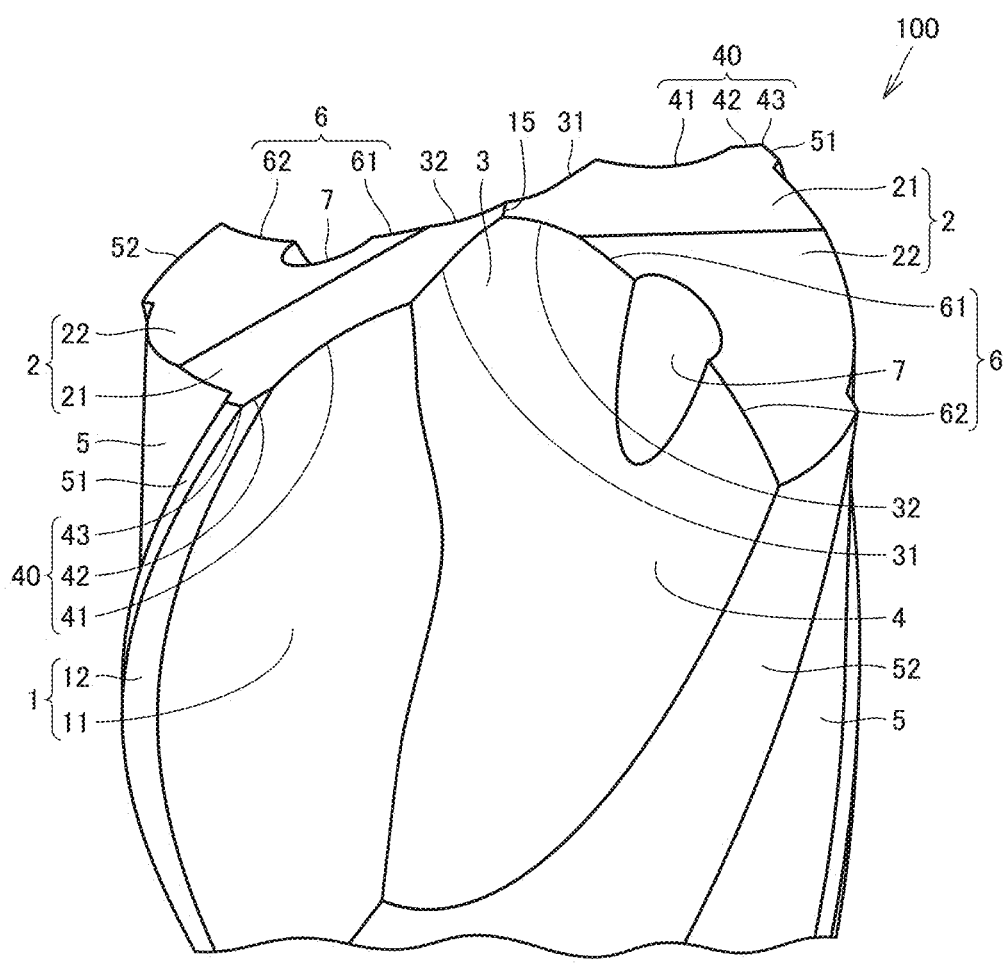
FIG. 2 is a schematic perspective view showing a configuration around a front end of the drill according to the first embodiment.

FIG. 2 is a schematic perspective view showing a configuration around front end 101 of drill 100 according to the first embodiment. As shown in FIG. 2, flank face 2 is contiguous to rake face 1. A ridgeline between rake face 1 and flank face 2 includes an outer cutting edge 40. A thinning face 3 is contiguous to each of rake face 1 and flank face 2. In the radial direction, thinning face 3 is located on the central axis X side relative to rake face 1. Thinning face 3 is contiguous to a chisel 15. Rake face 1 includes a first rake face portion 11 and a second rake face portion 12. First rake face portion 11 is contiguous to second rake face portion 12. In the radial direction, first rake face portion 11 is located on the central axis X side relative to second rake face portion 12. Outer circumferential surface 5 is contiguous to each of rake face 1 and flank face 2. Second rake face portion 12 is a return face, for example. Second rake face portion 12 may be tilted rearward in a rotational direction relative to first rake face portion 11.

A ridgeline between thinning face 3 and flank face 2 includes a first thinning portion 31 and a second thinning portion 32. First thinning portion 31 functions as a cutting edge. First thinning portion 31 is contiguous to outer cutting edge 40. In the radial direction, first thinning portion 31 is located on the central axis X side relative to outer cutting edge 40. Second thinning portion 32 is contiguous to first thinning portion 31. In the radial direction, second thinning portion 32 is located on the central axis X side relative to first thinning portion 31. First thinning portion 31 is located between second thinning portion 32 and outer cutting edge 40. At least a portion of second thinning portion 32 may function as a cutting edge.

Figure 3:
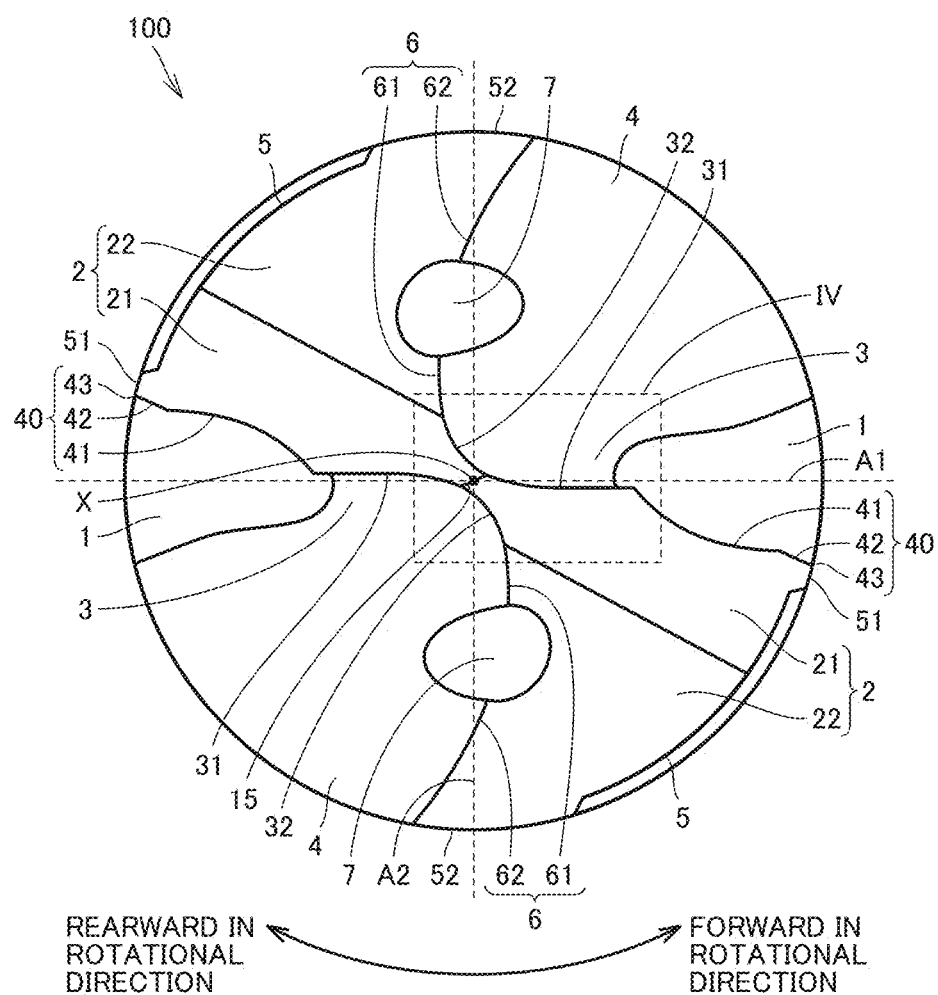
FIG. 3 is a schematic front view showing the configuration of the drill according to the first embodiment.

FIG. 3 is a schematic front view showing the configuration of drill 100 according to the first embodiment. FIG. 3 shows the front of drill 100, when viewed along the direction from front end 101 toward rear end 102. As shown in FIG. 3, a pair of outer cutting edge 40, first thinning portion 31 and second thinning portion 32 are provided at positions rotationally symmetric with respect to central axis X. From a different viewpoint, drill 100 according to the first embodiment has two cutting edges. Outer cutting edge 40 includes a first cutting edge 41, a second cutting edge 42, and an outer end portion 43. First cutting edge 41 is contiguous to first thinning portion 31. Second cutting edge 42 is contiguous to first cutting edge 41. Second cutting edge 42 is located closer to the outer circumference than first cutting edge 41. Second cutting edge 42 forms outer end portion 43. Outer end portion 43 is located closest to the outer circumference in outer cutting edge 40. First cutting edge 41 is located between first thinning portion 31 and second cutting edge 42.

As shown in FIG. 3, when seen in front view, first cutting edge 41 may be arc-shaped. First cutting edge 41 may be recessed rearward in the rotational direction. When seen in front view, second cutting edge 42 may be linear or arc-shaped. Flank face 2 may include a first flank face portion 21 and a second flank face portion 22. First flank face portion 21 is contiguous to each of outer cutting edge 40, first thinning portion 31 and second thinning portion 32. Second flank face portion 22 is contiguous to first flank face portion 21. Second flank face portion 22 is located rearward in the rotational direction relative to first flank face portion 21. Second flank face portion 22 may be tilted relative to first flank face portion 21.

As shown in FIGS. 2 and 3, drill 100 may include a heel face 4. Heel face 4 is contiguous to each of flank face 2 and thinning face 3, for example. Heel face 4 may be contiguous to outer circumferential surface 5. Heel face 4 is located rearward in the rotational direction relative to flank face 2. Heel face 4 is contiguous to second flank face portion 22. In the rotational direction of drill 100, second flank face portion 22 is located between first flank face portion 21 and heel face 4.

As shown in FIG. 3, outer circumferential surface 5 may be provided with a first margin 51 and a second margin 52. First margin 51 is contiguous to outer cutting edge 40. Second margin 52 is spaced from first margin 51. Second margin 52 is located rearward in the rotational direction relative to first margin 51. First margin 51 is contiguous to first flank face portion 21, for example. Second margin 52 is contiguous to second flank face portion 22, for example. Second margin 52 may be contiguous to heel face 4.

As shown in FIG. 3, when viewed in the direction along central axis X, a boundary line 6 between heel face 4 and flank face 2 may be curved. Drill 100 may be provided with a coolant hole 7. Coolant hole 7 may be provided so as to divide boundary line 6 between flank face 2 and heel face 4. Boundary line 6 includes a first heel portion 61 and a second heel portion 62. First heel portion 61 is contiguous to second thinning portion 32. Second heel portion 62 is contiguous to outer circumferential surface 5. Second heel portion 62 is spaced from first heel portion 61. Coolant hole 7 is provided between first heel portion 61 and second heel portion 62.

Figure 4:
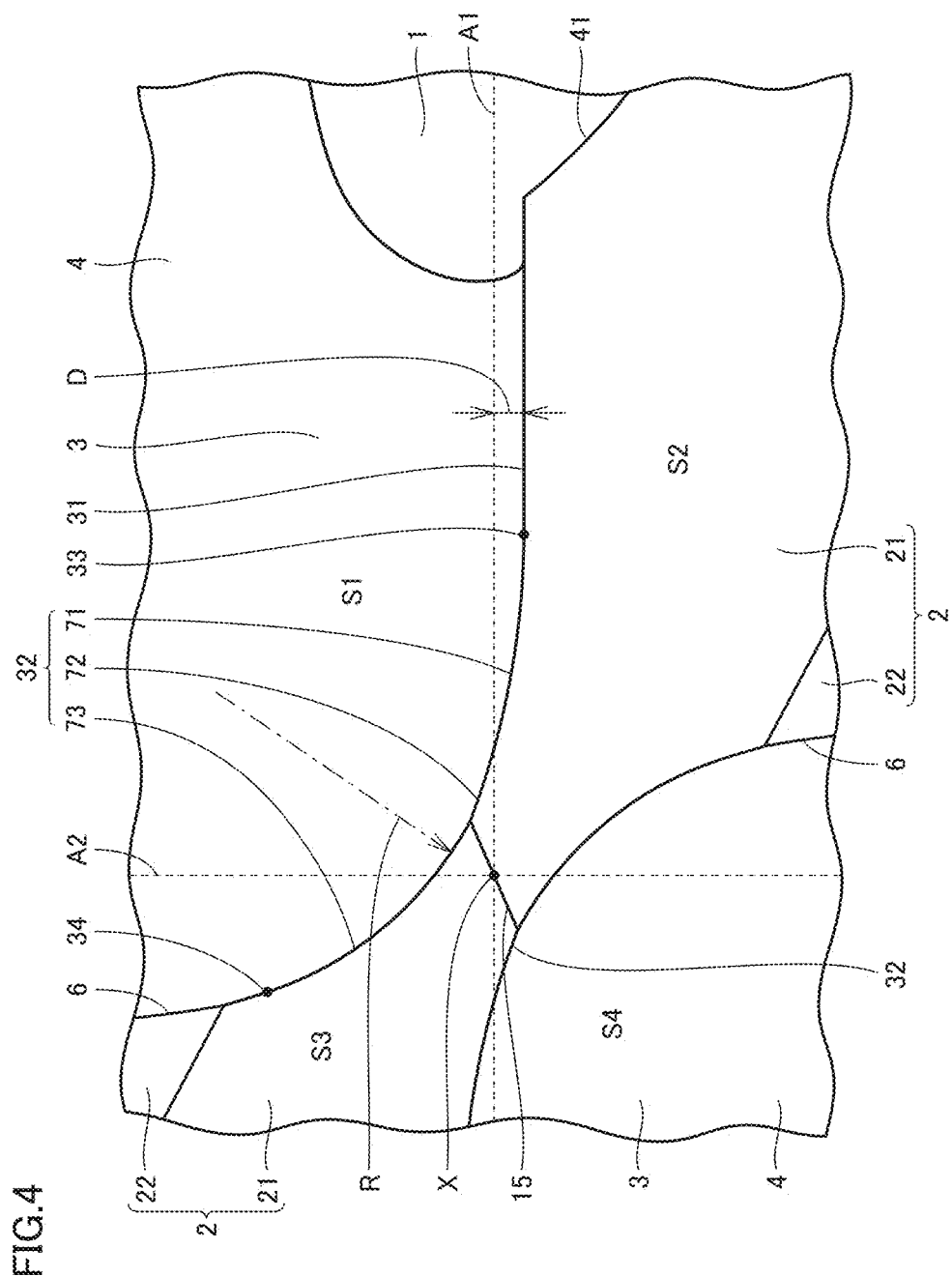
FIG. 4 is an enlarged schematic front view of a region IV in FIG. 3.

FIG. 4 is an enlarged schematic front view of a region IV in FIG. 3. As shown in FIG. 4, when viewed in the direction along central axis X, first thinning portion 31 is linear and second thinning portion 32 is curved. In the radial direction, second thinning portion 32 is curved so as to be recessed toward central axis X. Second thinning portion 32 is arc-shaped, for example. Second thinning portion 32 is contiguous to chisel 15. Second thinning portion 32 may have a radius of curvature R which is more than or equal to 5% and less than or equal to 30% of twice a distance between outer end portion 43 of outer cutting edge 40 and central axis X. The twice the distance between outer end portion 43 of outer cutting edge 40 and central axis X corresponds to the diameter of a cutting edge of drill 100. A lower limit of radius of curvature R of second thinning portion 32 is not particularly limited, and may be, for example, more than or equal to 10%, or more than or equal to 15% of twice the distance between outer end portion 43 of outer cutting edge 40 and central axis X. An upper limit of radius of curvature R of second thinning portion 32 is not particularly limited, and may be, for example, less than or equal to 25%, or less than or equal to 20% of twice the distance between outer end portion 43 of outer cutting edge 40 and central axis X.

As shown in FIG. 4, when viewed in the direction along central axis X, a straight line passing through central axis X and parallel to first thinning portion 31 is a first straight line A1, and a straight line perpendicular to first straight line A1 is a second straight line A2. When viewed in the direction along central axis X, first thinning portion 31 is located rearward in the rotational direction relative to first straight line A1, and is located forward in the rotational direction relative to second straight line A2. When viewed in the direction along central axis X, a boundary (first boundary 33) between first thinning portion 31 and second thinning portion 32 is located rearward in the rotational direction relative to first straight line A1, and is located forward in the rotational direction relative to second straight line A2.

In FIG. 4, a region above first straight line A1 and to the right of second straight line A2 is a first region S1. A region below first straight line A1 and to the right of second straight line A2 is a second region S2. A region above first straight line A1 and to the left of second straight line A2 is a third region S3. A region below first straight line A1 and to the left of second straight line A2 is a fourth region S4. First thinning portion 31 is located in second region S2. The boundary (first boundary 33) between first thinning portion 31 and second thinning portion 32 is located in second region S2. A boundary (second boundary 34) between boundary line 6 between flank face 2 and heel face 4 and second thinning portion 32 is located in third region S3.

As shown in FIG. 4, when viewed in the direction along central axis X, second thinning portion 32 may intersect each of first straight line A1 and second straight line A2. Specifically, second thinning portion 32 may intersect a boundary line between first region S1 and second region S2, and a boundary line between first region S1 and third region S3. Second thinning portion 32 is located in first region S1, second region S2 and third region S3. From a different viewpoint, second thinning portion 32 includes a second portion 72 located in first region S1, a first portion 71 located in second region S2, and a third portion 73 located in third region S3.

First portion 71 is contiguous to each of first thinning portion 31 and second portion 72. First portion 71 is located between first thinning portion 31 and second portion 72. Second portion 72 is contiguous to each of first portion 71 and third portion 73. Second portion 72 is located between first portion 71 and third portion 73. Third portion 73 is contiguous to each of second portion 72 and boundary line 6. Third portion 73 is located between second portion 72 and boundary line 6. Second portion 72 is contiguous to chisel 15.

As shown in FIG. 4, when viewed in the direction along central axis X, a distance D between first thinning portion 31 and first straight line A1 is, for example, more than or equal to 0.001 mm and less than or equal to 1.0 mm. A lower limit of distance D between first thinning portion 31 and first straight line A1 is not particularly limited, and may be, for example, more than or equal to 0.15 mm, or more than or equal to 0.2 mm. An upper limit of distance D between first thinning portion 31 and first straight line A1 is not particularly limited, and may be, for example, less than or equal to 0.95 mm, or less than or equal to 0.9 mm. Distance D between first thinning portion 31 and first straight line A1 is a distance between first thinning portion 31 and first straight line A1 in a direction perpendicular to first straight line A1.

Figure 5:
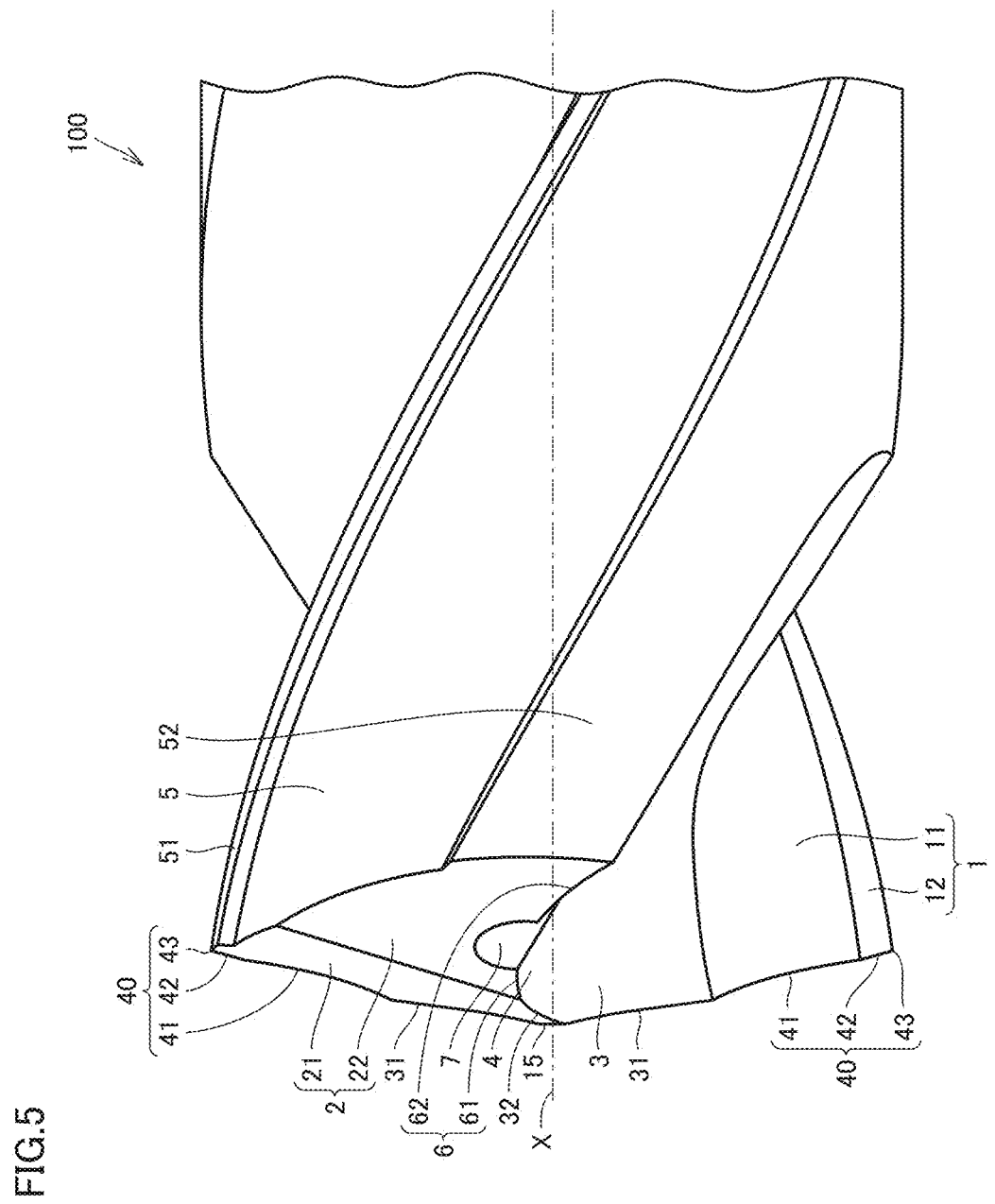
FIG. 5 is an enlarged schematic plan view of a region V in FIG. 1.

FIG. 5 is an enlarged schematic plan view of a region V in FIG. 1. As shown in FIG. 5, a portion of coolant hole 7 opens to second flank face portion 22, and the rest of coolant hole 7 opens to heel face 4. From a different viewpoint, coolant hole 7 is provided to extend from second flank face portion 22 to heel face 4. As shown in FIG. 5, when viewed in a direction perpendicular to central axis X, outer cutting edge 40 is located on the rear end 102 side relative to first thinning portion 31. When viewed in the direction perpendicular to central axis X, second cutting edge 42 is located on the rear end 102 side relative to first cutting edge 41. When viewed in the direction perpendicular to central axis X, boundary line 6 is located on the rear end 102 side relative to second thinning portion 32.

Second Embodiment

Next, a configuration of drill 100 according to a second embodiment of the present disclosure is described. Drill 100 according to the second embodiment is different from drill 100 according to the first embodiment in that coolant hole 7 is provided at a position spaced from boundary line 6, and is otherwise similar in configuration to drill 100 according to the first embodiment. A configuration different from that of drill 100 according to the first embodiment is mainly described below.

Figure 6:
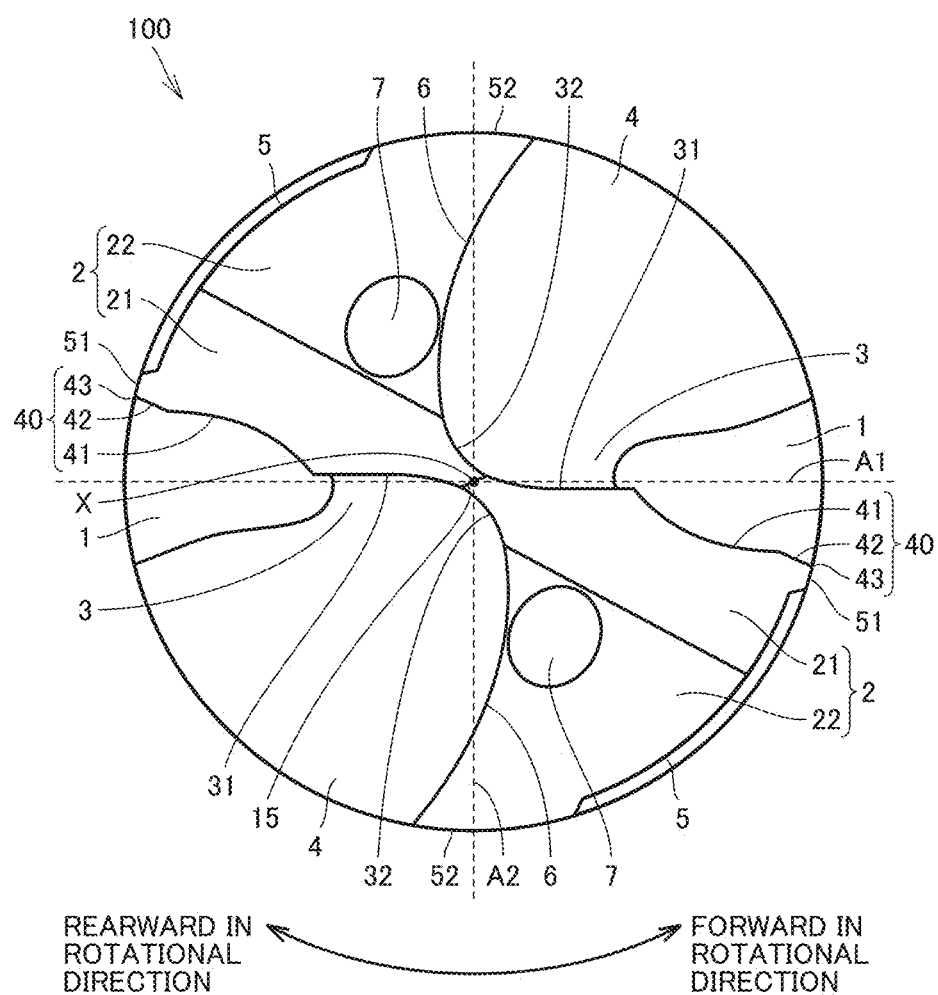
FIG. 6 is a schematic front view showing a configuration of a drill according to a second embodiment.
Figure 7:
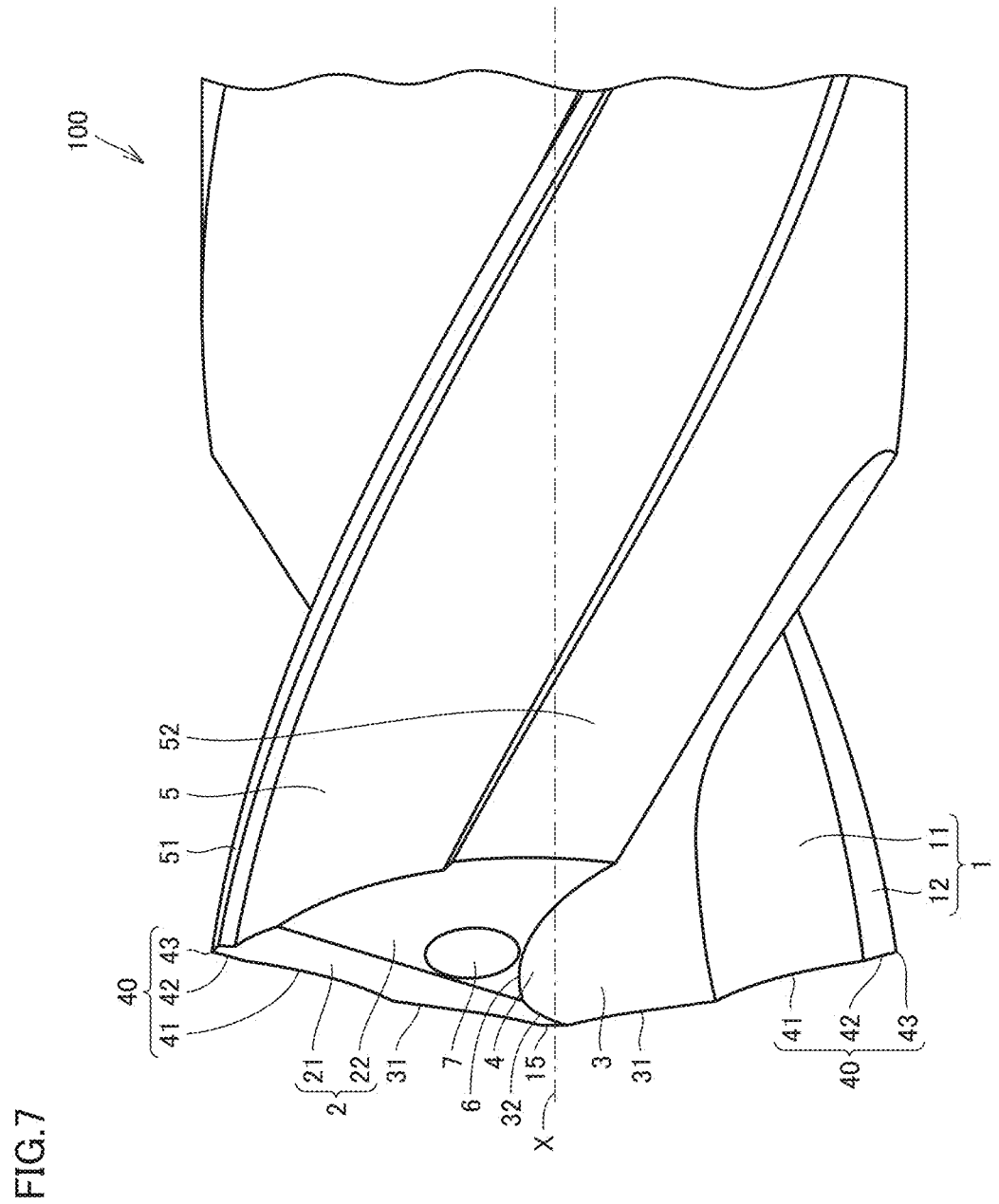
FIG. 7 is an enlarged schematic plan view showing the configuration of the drill according to the second embodiment.

FIG. 6 is a schematic front view showing the configuration of drill 100 according to the second embodiment. The schematic front view shown in FIG. 6 corresponds to FIG. 3 of drill 100 according to the first embodiment. FIG. 7 is an enlarged schematic plan view showing the configuration of drill 100 according to the second embodiment. The enlarged schematic plan view shown in FIG. 7 corresponds to FIG. 5 of drill 100 according to the first embodiment.

As shown in FIGS. 6 and 7, coolant hole 7 is at a position spaced from boundary line 6. Specifically, coolant hole 7 is provided in flank face 2. Coolant hole 7 may be provided in second flank face portion 22, or in first flank face portion 21, or in a boundary between first flank face portion 21 and second flank face portion 22. Coolant hole 7 is spaced from heel face 4. As shown in FIG. 6, when viewed in the direction along central axis X, coolant hole 7 may have a substantially elliptical shape. As shown in FIG. 7, coolant hole 7 opens only to flank face 2, and does not open to heel face 4.

Third Embodiment

Next, a configuration of drill 100 according to a third embodiment of the present disclosure is described. Drill 100 according to the third embodiment is different from drill 100 according to the first embodiment in that boundary line 6 between heel face 4 and flank face 2 is linear, and is otherwise similar in configuration to drill 100 according to the first embodiment. A configuration different from that of drill 100 according to the first embodiment is mainly described below.

Figure 8:
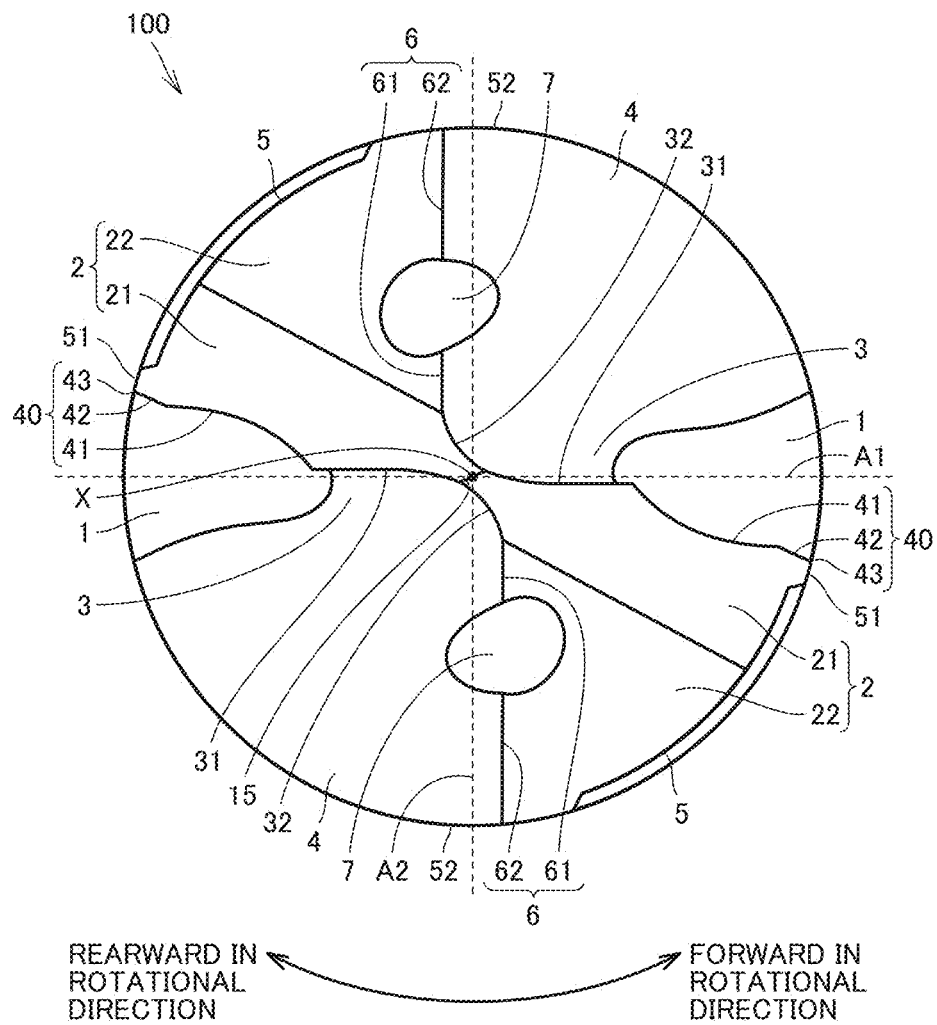
FIG. 8 is a schematic front view showing a configuration of a drill according to a third embodiment.
Figure 9:
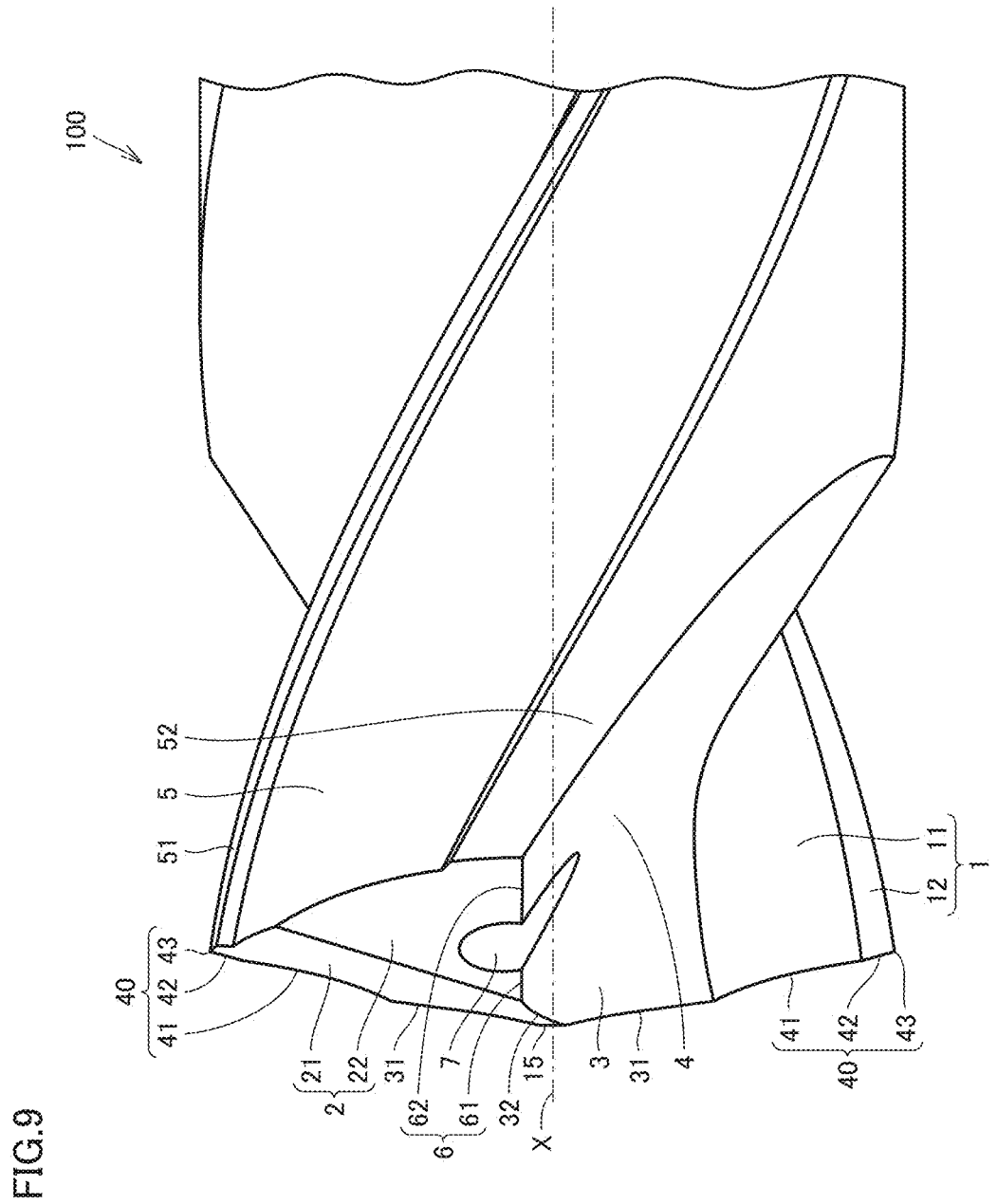
FIG. 9 is an enlarged schematic plan view showing the configuration of the drill according to the third embodiment.

FIG. 8 is a schematic front view showing the configuration of drill 100 according to the third embodiment. The schematic front view shown in FIG. 8 corresponds to FIG. 3 of drill 100 according to the first embodiment. FIG. 9 is an enlarged schematic plan view showing the configuration of drill 100 according to the third embodiment. The enlarged schematic plan view shown in FIG. 9 corresponds to FIG. 5 of drill 100 according to the first embodiment.

As shown in FIG. 8, when viewed in the direction along central axis X, boundary line 6 between heel face 4 and flank face 2 may be linear. As shown in FIG. 9, coolant hole 7 is provided to extend from second flank face portion 22 to heel face 4. Coolant hole 7 divides boundary line 6. Boundary line 6 includes first heel portion 61 and second heel portion 62. As shown in FIG. 8, when viewed in the direction along central axis X, first heel portion 61 and second heel portion 62 are each linear. When viewed in the direction along central axis X, second heel portion 62 may have a longer length than first heel portion 61.

Fourth Embodiment

Next, a configuration of drill 100 according to a fourth embodiment of the present disclosure is described. Drill 100 according to the fourth embodiment is different from drill 100 according to the first embodiment in that boundary line 6 between heel face 4 and flank face 2 is linear, and that coolant hole 7 is provided at a position spaced from boundary line 6, and is otherwise similar in configuration to drill 100 according to the first embodiment. A configuration different from that of drill 100 according to the first embodiment is mainly described below.

Figure 10:
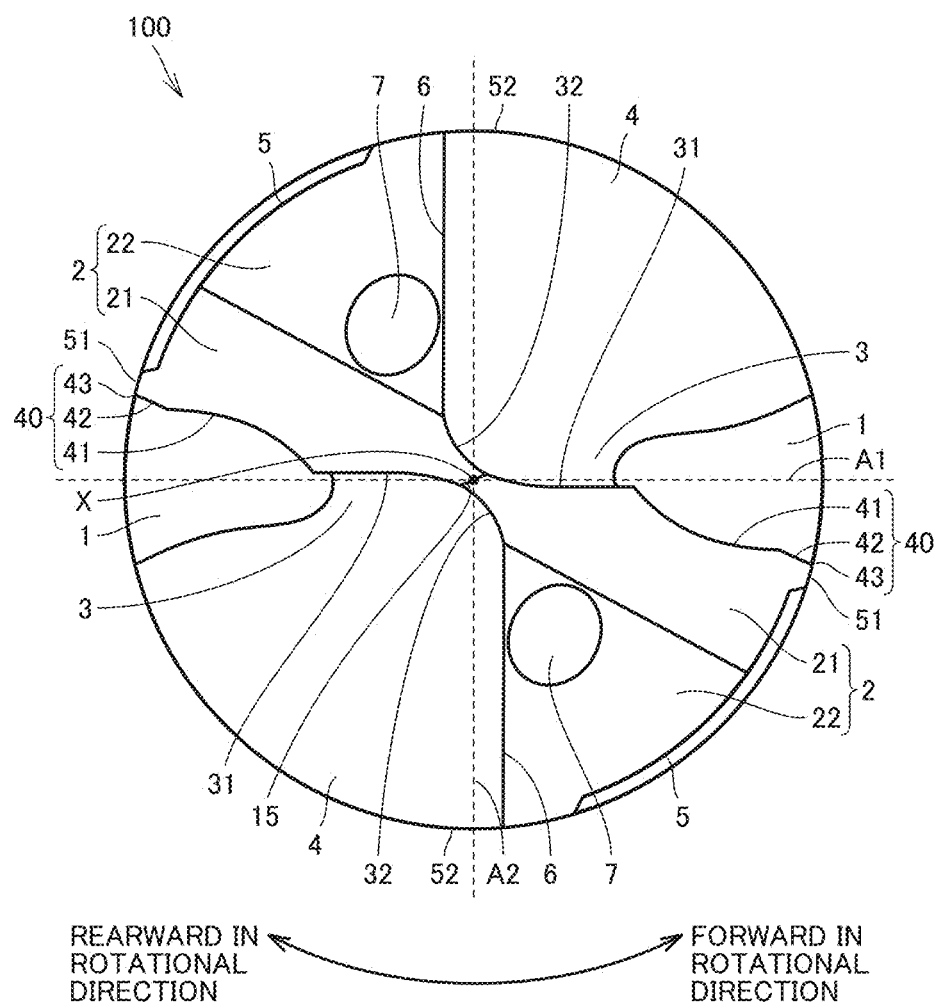
FIG. 10 is a schematic front view showing a configuration of a drill according to a fourth embodiment.
Figure 11:
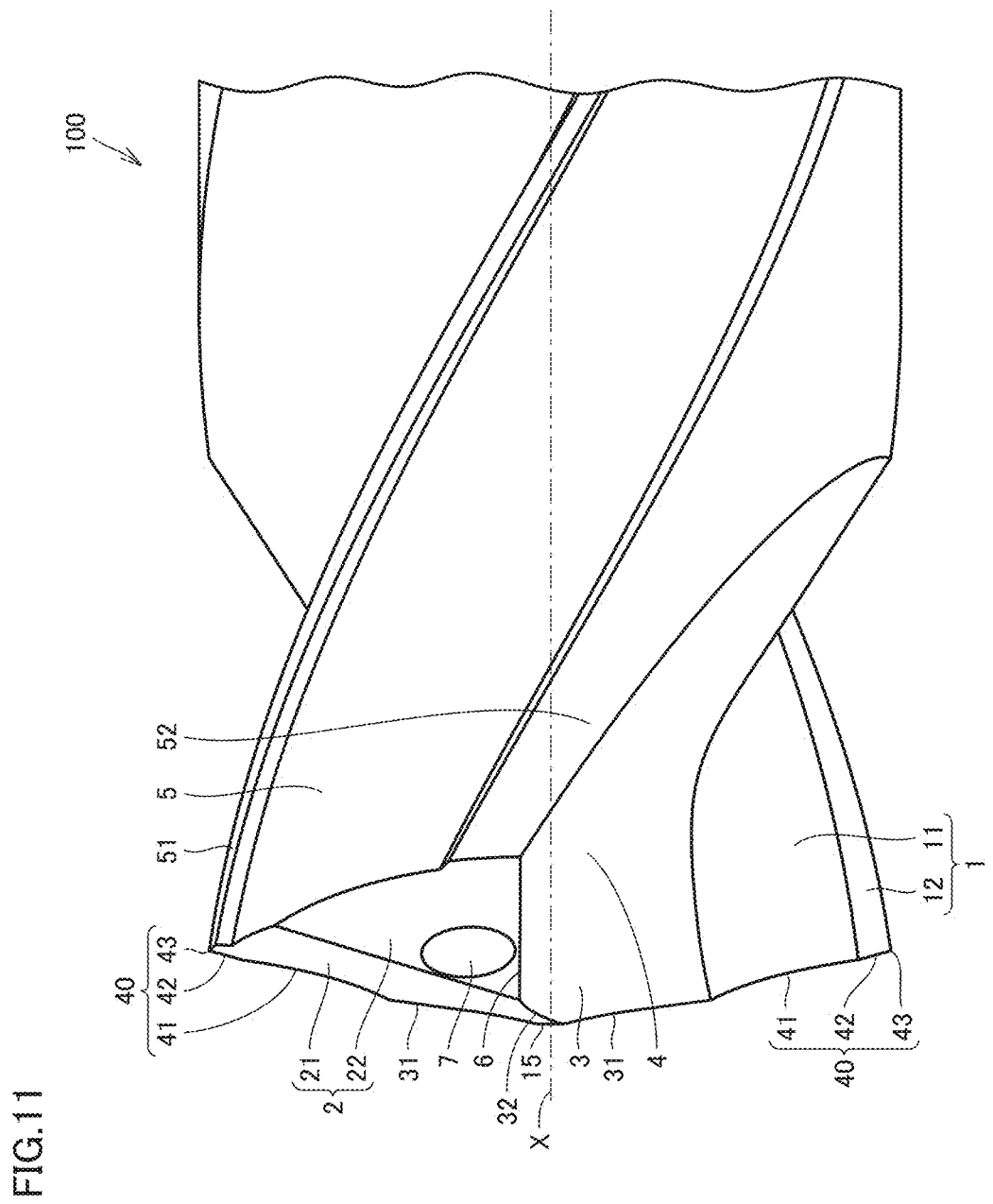
FIG. 11 is an enlarged schematic plan view showing the configuration of the drill according to the fourth embodiment.

FIG. 10 is a schematic front view showing the configuration of drill 100 according to the fourth embodiment. The schematic front view shown in FIG. 10 corresponds to FIG. 3 of drill 100 according to the first embodiment. FIG. 11 is an enlarged schematic plan view showing the configuration of drill 100 according to the fourth embodiment. The enlarged schematic plan view shown in FIG. 11 corresponds to FIG. 5 of drill 100 according to the first embodiment.

As shown in FIG. 10, when viewed in the direction along central axis X, boundary line 6 between heel face 4 and flank face 2 may be linear. Coolant hole 7 is provided at a position spaced from boundary line 6. Specifically, coolant hole 7 is provided in flank face 2. Coolant hole 7 may be provided in second flank face portion 22, or in first flank face portion 21, or in the boundary between first flank face portion 21 and second flank face portion 22. Coolant hole 7 is spaced from heel face 4. As shown in FIG. 10, when viewed in the direction along central axis X, coolant hole 7 may have a substantially elliptical shape. As shown in FIG. 11, coolant hole 7 opens only to flank face 2, and does not open to heel face 4.

Next, functions and advantageous effects of drill 100 according to the above embodiments are described.

Figure 12:
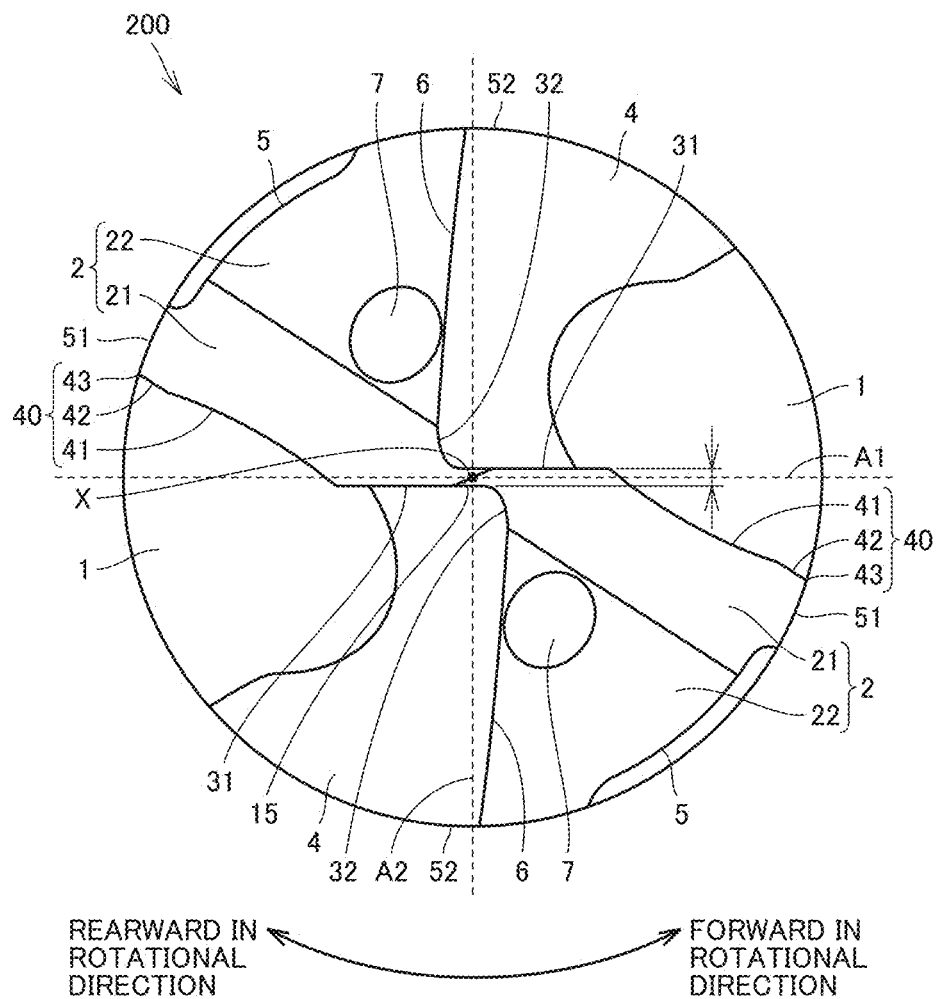
FIG. 12 is a schematic front view showing a configuration of a drill according to a comparative example.

FIG. 12 is a schematic front view showing a configuration of a drill 200 according to a comparative example. As shown in FIG. 12, drill 200 according to the comparative example includes first thinning portion 31 and second thinning portion 32. When viewed in the direction along central axis X, a straight line passing through central axis X and parallel to first thinning portion 31 is first straight line A1, and a straight line perpendicular to first straight line A1 is second straight line A2. As shown in FIG. 12, when viewed in the direction along central axis X, first thinning portion 31 is located forward in the rotational direction relative to first straight line A1.

In drill 100 according to the above embodiments, on the other hand, when viewed in the direction along central axis X, first thinning portion 31, and the boundary between first thinning portion 31 and second thinning portion 32 are located rearward in the rotational direction relative to first straight line A1, where first straight line A1 is a straight line passing through central axis X and parallel to first thinning portion 31, and second straight line A2 is a straight line perpendicular to first straight line A1 (see FIG. 4).

Figure 13:
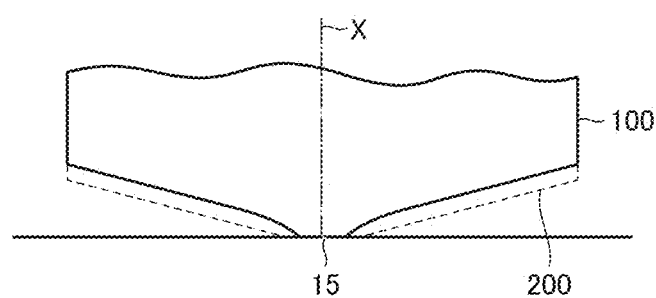
FIG. 13 is a schematic diagram of rotational projection for comparing the configurations of the drill according to the first embodiment and the drill according to the comparative example.

FIG. 13 is a schematic diagram of rotational projection for comparing the configurations of drill 100 according to the first embodiment and drill 200 according to the comparative example. In FIG. 13, drill 100 according to the first embodiment is shown by solid lines, and drill 200 according to the comparative example is shown by dashed lines. As shown in FIG. 13, the width around chisel 15 in drill 100 according to the first embodiment is smaller than the width around chisel 15 in drill 200 according to the comparative example. As compared to drill 200 according to the comparative example, drill 100 according to the first embodiment can allow a front end portion of drill 100 to be pointed. As compared to drill 200 according to the comparative example, therefore, drill 100 according to the first embodiment can have an improved function of biting into a workpiece in drilling. As a result, hole positional tolerance can be improved.

In addition, when first thinning portion 31 and outer cutting edge 40 are each curved so as to be recessed rearward in the rotational direction, a portion around a boundary between first thinning portion 31 and outer cutting edge 40 is pointed. In this case, swarf that has been cut at first thinning portion 31 and swarf that has been cut at outer cutting edge 40 are divided and separately generated. As a result, the resulting swarf increases in length, causing degradation in swarf discharging performance.

In drill 100 according to the above embodiments, on the other hand, when viewed in the direction along central axis X, first thinning portion 31 is linear. As compared to the example where first thinning portion 31 and outer cutting edge 40 are each curved so as to be recessed rearward in the rotational direction, the boundary portion between first thinning portion 31 and outer cutting edge 40 is pointed to a lesser degree. In this case, swarf that has been cut at first thinning portion 31 and swarf that has been cut at outer cutting edge 40 are integrated. As a result, an increase in length of the swarf can be suppressed, leading to improvement in swarf discharging performance.

Further, in drill 100 according to the above embodiments, when viewed in the direction along central axis X, second thinning portion 32 may have a radius of curvature which is more than or equal to 5% and less than or equal to 30% of twice the distance between outer end portion 43 of outer cutting edge 40 and central axis X. By setting the radius of curvature of second thinning portion 32 to more than or equal to 5% of twice the distance between outer end portion 43 of outer cutting edge 40 and central axis X, an excessive reduction in length of second thinning portion 32 can be suppressed. As a result, an increase in cutting resistance can be suppressed. By setting the radius of curvature of second thinning portion 32 to less than or equal to 30% of twice the distance between outer end portion 43 of outer cutting edge 40 and central axis X, an excessive reduction in thickness in the vicinity of second thinning portion 32 can be suppressed. As a result, a reduction in strength of drill 100 can be suppressed.

Further, in drill 100 according to the above embodiments, outer circumferential surface 5 may be provided with first margin 51 contiguous to outer cutting edge 40, and second margin 52 spaced rearward in the rotational direction from first margin 51. When viewed in the direction along central axis X, boundary line 6 between heel face 4 and flank face 2 may be linear. As compared to the example where boundary line 6 between heel face 4 and flank face 2 is curved, it is unnecessary to perform a curving process when boundary line 6 between heel face 4 and flank face 2 is linear, and machining of heel face 4 is thereby facilitated.

Further, in drill 100 according to the above embodiments, outer circumferential surface 5 may be provided with first margin 51 contiguous to outer cutting edge 40, and second margin 52 spaced rearward in the rotational direction from first margin 51. When viewed in the direction along central axis X, boundary line 6 between heel face 4 and flank face 2 may be curved. As compared to the example where boundary line 6 between heel face 4 and flank face 2 is linear, the width of second margin 52 can be increased when boundary line 6 between heel face 4 and flank face 2 is curved. Thus, second margin 52 can perform a guiding function from an early stage of drilling.

Further, in drill 100 according to the above embodiments, when viewed in the direction along central axis X, the distance between first thinning portion 31 and first straight line A1 may be more than or equal to 0.001 mm and less than or equal to 1.0 mm. By setting the distance between first thinning portion 31 and first straight line A1 to more than or equal to 0.001 mm, the function of biting into a workpiece in drilling can be further improved. By setting the distance between first thinning portion 31 and first straight line A1 to less than or equal to 1.0 mm, an excessive reduction in length of first thinning portion 31 can be suppressed.

Example (Preparation of Samples)

First, drill 200 of a sample 1 and drill 100 of a sample 2 were prepared. Drill 200 of sample 1 is a comparative example. The configuration of drill 200 of sample 1 is shown in FIG. 12. In drill 200 of sample 1, when viewed in the direction along central axis X, first thinning portion 31 is located forward in the rotational direction relative to first straight line A1. Drill 100 of sample 2 is an example. The configuration of drill 100 of sample 2 is shown in FIG. 3. In drill 100 of sample 2, when viewed in the direction along central axis X, first thinning portion 31 is located rearward in the rotational direction relative to first straight line A1.

(Evaluation Conditions)

Next, drilling was performed on a workpiece using drill 200 of sample 1 and drill 100 of sample 2. The workpiece used was ADC 12, an Al—Si—Cu-based die casting material as specified by Japanese Industrial Standards (JIS) H5302: 2006. The equipment used was a vertical machining center (ROBODRILL α-T14iF$_{La}$ manufactured by FANUC CORPORATION). The rotational speed was set to 80 m/minute and 180 m/minute. The feed was set to 0.6 mm/rotation and 1.2 mm/rotation. The depth of a hole was set to 30 mm. Oil was internally supplied.

(Evaluation Results)

Figure 14:
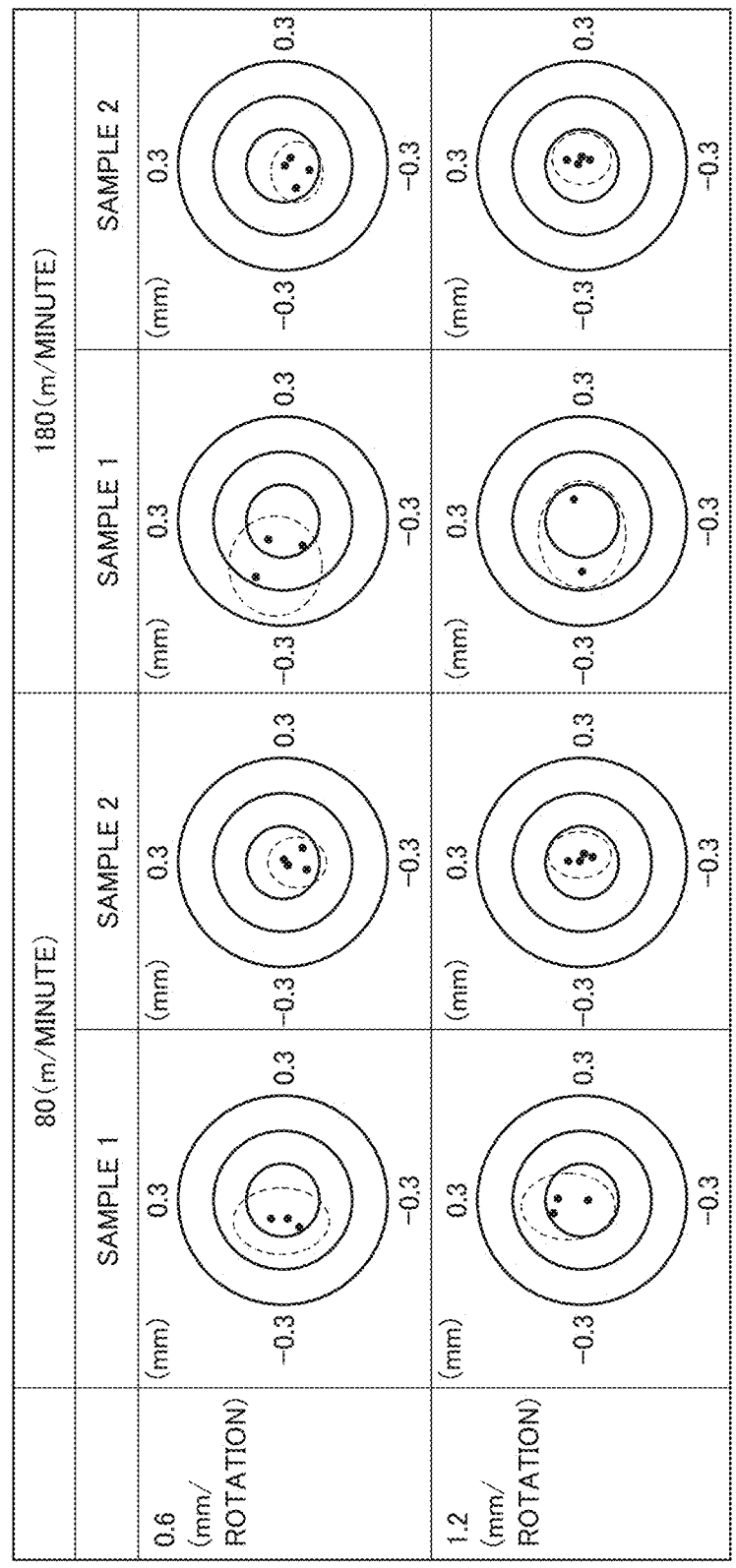
FIG. 14 is a diagram showing hole positional tolerances of a drill of a sample 1 and a drill of a sample 2.

FIG. 14 is a diagram showing hole positional tolerances of drill 200 of sample 1 and drill 100 of sample 2. In FIG. 14, the center of three concentric circles is a point at a theoretically correct position. The hole positional tolerance is the diameter of a geometric circle passing through a central position of a hole actually formed, with the theoretically correct position as the center. In FIG. 14, a point indicated by a black circle is a central position of a hole actually formed. As the distance between the position of the black circle and the center of the concentric circles increases, the hole positional tolerance increases. It is desirable that the hole positional tolerance be small.

As shown in FIG. 14, when compared under conditions of the same rotational speed and the same feed, the hole positional tolerance of drill 100 of sample 2 was smaller than the hole positional tolerance of drill 200 of sample 1. In other words, it was confirmed that drill 100 of sample 2 could improve the hole positional tolerance as compared to drill 200 of sample 1.

Figure 15:
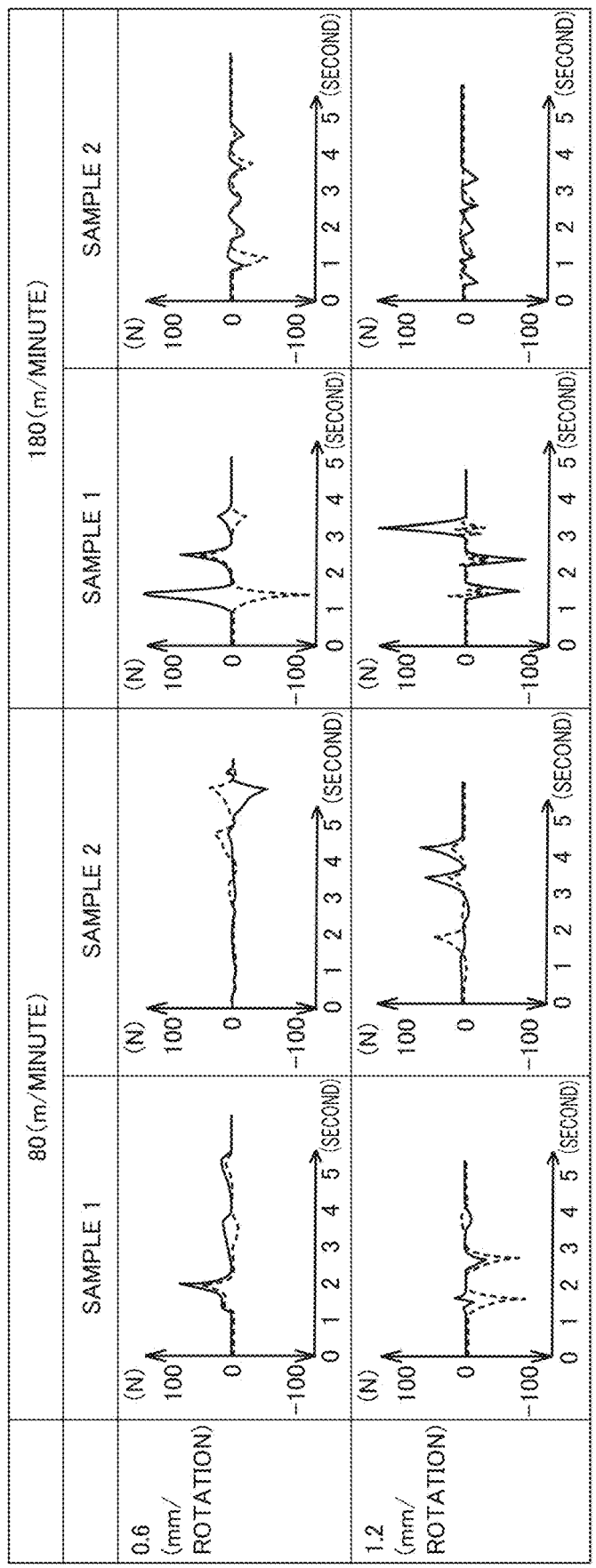
FIG. 15 is a diagram showing cutting resistances of the drill of sample 1 and the drill of sample 2.

FIG. 15 is a diagram showing cutting resistances of drill 200 of sample 1 and drill 100 of sample 2. In FIG. 15, the abscissa represents time, and the ordinate represents cutting resistance. Solid lines and dashed lines each show cutting resistance in a horizontal direction perpendicular to a thrust direction. The solid line indicates cutting resistance in a first direction. The dashed line indicates cutting resistance in a second direction. The first direction is orthogonal to the second direction.

As shown in FIG. 15, when compared under conditions of the same rotational speed and the same feed, the cutting resistance of drill 100 of sample 2 was smaller than the cutting resistance of drill 200 of sample 1. In other words, it was confirmed that drill 100 of sample 2 could reduce the cutting resistance as compared to drill 200 of sample 1.

It should be understood that the embodiments and example disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 rake face; 2 flank face; 3 thinning face; 4 heel face; 5 outer circumferential surface; 6 boundary line; 7 coolant hole; 11 first rake face portion; 12 second rake face portion; 13 shank; 14 flute; 15 chisel; 21 first flank face portion; 22 second flank face portion; 31 first thinning portion; 32 second thinning portion; 33 first boundary; 34 second boundary; 40 outer cutting edge; 41 first cutting edge; 42 second cutting edge; 43 outer end portion; 51 first margin; 52 second margin; 61 first heel portion; 62 second heel portion; 71 first portion; 72 second portion; 73 third portion; 100, 200 drill; 101 front end; 102 rear end; A1 first straight line; A2 second straight line; D distance; R radius of curvature; S1 first region; S2 second region; S3 third region; S4 fourth region; X central axis.

The invention claimed is:

1. A drill that rotates around a central axis, comprising:
a rake face that includes a first rake face portion and a second rake face portion;
a flank face contiguous to the rake face; and
a thinning face contiguous to each of the rake face and the flank face,
wherein a ridgeline between the rake face and the flank face includes an outer cutting edge, and
wherein a ridgeline between the thinning face and the flank face includes a first thinning portion contiguous to the outer cutting edge, and a second thinning portion contiguous to the first thinning portion,
when viewed in a direction along the central axis, the first thinning portion is linear and the second thinning portion is curved, and
when viewed in the direction along the central axis, the first thinning portion, and a boundary between the first thinning portion and the second thinning portion are located rearward in a rotational direction relative to a first straight line, and are located forward in the rotational direction relative to a second straight line, the first straight line being a straight line passing through the central axis and parallel to the first thinning portion, and the second straight line being a straight line perpendicular to the first straight line, and
wherein the first rake face portion is contiguous to the second rake face portion,
wherein in a radial direction, the first rake portion is located on the central axis side relative to the second rake face portion,
wherein the second rake face portion is tiled rearward in the rotational direction relative to the first rake face portion,
wherein a maximum length of the second rake face portion in the direction along the central axis is greater than a maximum length of the second rake face portion in the radial direction, and
wherein when viewed in the direction along the central axis, the second thinning portion intersects each of the first straight line and the second straight line.

2. The drill according to claim 1, wherein
when viewed in the direction along the central axis, the second thinning portion has a radius of curvature which is more than or equal to 5% and less than or equal to 30% of twice a distance between an outer end portion of the outer cutting edge and the central axis.

3. The drill according to claim 1, further comprising:
an outer circumferential surface contiguous to each of the rake face and the flank face; and
a heel face contiguous to each of the outer circumferential surface, the flank face and the thinning face, wherein
the outer circumferential surface is provided with a first margin contiguous to the outer cutting edge, and a second margin spaced rearward in the rotational direction from the first margin, and
when viewed in the direction along the central axis, a boundary line between the heel face and the flank face is linear.

4. The drill according to claim 3, wherein
a coolant hole is provided at a position spaced from the boundary line.

5. The drill according to claim 3, wherein
a coolant hole is provided so as to divide the boundary line.
6. The drill according to claim 1, further comprising:
an outer circumferential surface contiguous to each of the rake face and the flank face; and
a heel face contiguous to each of the outer circumferential surface, the flank face and the thinning face, wherein
the outer circumferential surface is provided with a first margin contiguous to the outer cutting edge, and a second margin spaced rearward in the rotational direction from the first margin, and
when viewed in the direction along the central axis, a boundary line between the heel face and the flank face is curved.
7. The drill according to claim 6, wherein
a coolant hole is provided at a position spaced from the boundary line.
8. The drill according to claim 6, wherein
a coolant hole is provided so as to divide the boundary line.
9. The drill according to claim 1, wherein
when viewed in the direction along the central axis, a distance between the first thinning portion and the first straight line is more than or equal to 0.001 mm and less than or equal to 1.0 mm.
10. A drill that rotates around a central axis, comprising:
a rake face that includes a first rake face portion and a second rake face portion;
a flank face contiguous to the rake face; and
a thinning face contiguous to each of the rake face and the flank face, wherein
a ridgeline between the rake face and the flank face includes an outer cutting edge,
a ridgeline between the thinning face and the flank face includes a first thinning portion contiguous to the outer cutting edge, and a second thinning portion contiguous to the first thinning portion,
when viewed in a direction along the central axis, the first thinning portion is linear and the second thinning portion is curved,
when viewed in the direction along the central axis, the first thinning portion, and a boundary between the first thinning portion and the second thinning portion are located rearward in a rotational direction relative to a first straight line, and are located forward in the rotational direction relative to a second straight line, the first straight line being a straight line passing through the central axis and parallel to the first thinning portion, and the second straight line being a straight line perpendicular to the first straight line,
when viewed in the direction along the central axis, the second thinning portion has a radius of curvature which is more than or equal to 5% and less than or equal to 30% of twice a distance between an outer end portion of the outer cutting edge and the central axis, and
when viewed in the direction along the central axis, a distance between the first thinning portion and the first straight line is more than or equal to 0.001 mm and less than or equal to 1.0 mm, and
wherein the first rake face portion is contiguous to the second rake face portion,
wherein in a radial direction, the first rake portion is located on the central axis side relative to the second rake face portion,
wherein the second rake face portion is tiled rearward in the rotational direction relative to the first rake face portion,
wherein a maximum length of the second rake face portion in the direction along the central axis is greater than a maximum length of the second rake face portion in the radial direction, and
wherein when viewed in the direction along the central axis, the second thinning portion intersects each of the first straight line and the second straight line.

* * * * *